Figure 1:
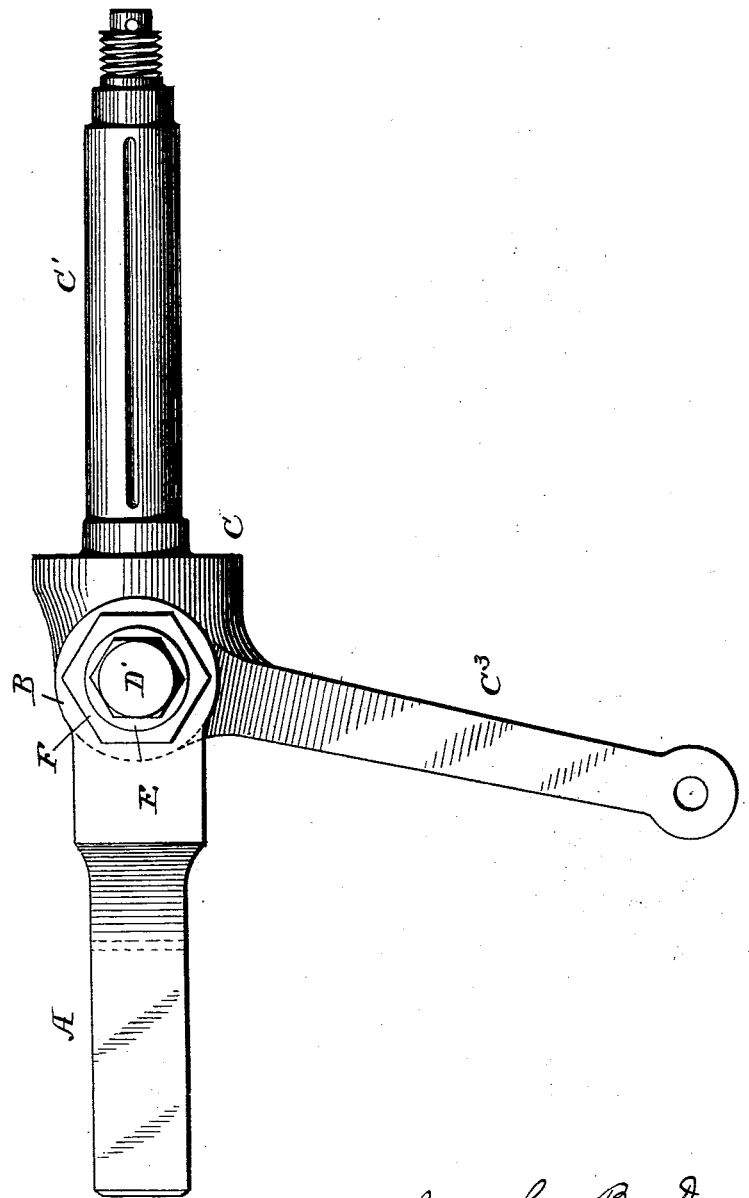

No. 664,729. Patented Dec. 25, 1900.
J. B. DECKER.
STEERING AXLE FOR AUTOMOBILES.
(Application filed Oct. 29, 1900.)

(No Model.) 2 Sheets—Sheet 1.

Witnesses
J. G. Hinkel
H. M. Gillman, Jr.

Inventor
Jacob B. Decker
By Foster Freeman Attorneys

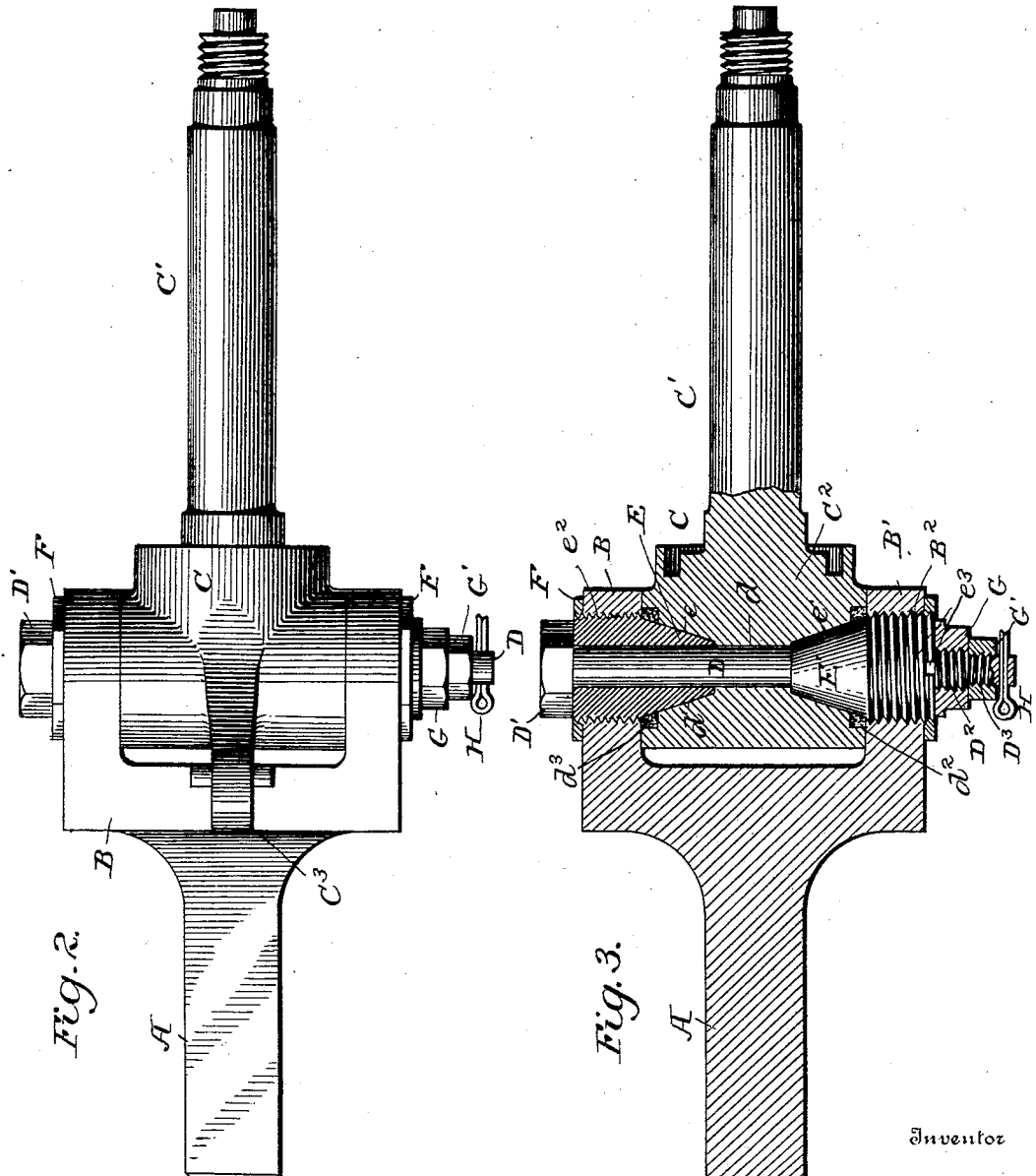

UNITED STATES PATENT OFFICE.

JACOB B. DECKER, OF WILKES-BARRÉ, PENNSYLVANIA, ASSIGNOR TO THE SHELDON AXLE COMPANY, OF SAME PLACE.

STEERING-AXLE FOR AUTOMOBILES.

SPECIFICATION forming part of Letters Patent No. 664,729, dated December 25, 1900.

Application filed October 29, 1900. Serial No. 34,832. (No model.)

*To all whom it may concern:*

Be it known that I, JACOB B. DECKER, a citizen of the United States, residing at Wilkes-Barré, in the county of Luzerne and State of Pennsylvania, have invented certain new and useful Improvements in Steering-Axles for Automobiles, of which the following is a specification.

My invention relates to steering-axles for automobiles and the like, and has for its object to provide a construction of steering-axle which shall be efficient and furnish a tight joint and be practically antirattling and at the same time properly support the wheels and be capable of easy adjustment for the purpose of steering and otherwise; and to these ends my invention consists in a steering-axle embodying the features of construction and arrangement of parts and having the general mode of operation substantially as hereinafter more particularly set forth.

Referring to the accompanying drawings, Figure 1 is a plan view showing a portion of an axle with the steering-axle mounted therein. Fig. 2 is a side view of the same, and Fig. 3 is a longitudinal vertical section of Fig. 2.

In the ordinary construction of the modern automobile it is common to have the front and rear axles rigidly connected together and to attach to one of the axles (generally the front axle) what are usually termed the "steering-axles," on which the wheels are mounted. These steering-axles are usually supported at one end in the ends of the main axle of the vehicle and necessarily are subjected to great strain, and it is important that they should be strongly and firmly supported and yet be capable of easy and quick adjustment in steering or guiding the machine. It has been found that these parts are subject to considerable wear and the points of union are liable to get loose and rattle, and in order to avoid these disadvantages and others which are apparent to those skilled in the art I have made the present invention, the features of construction of which will now be set forth.

Referring to the accompanying drawings, A represents an end of one of the main axles of an automobile or other vehicle, and this end is provided with or preferably formed into a fork-shaped terminal having fork arms or ends B B'. The steering-axle proper, C, which may be called a "knuckle," comprises an axle portion C', on which the wheel is mounted in any desired way, a bearing portion $C^2$, and an operating-arm $C^3$. The bearing portion $C^2$ of the knuckle is formed of a shape to fit between the arms B B' of the fork and is provided with an opening $d$ to receive a swivel-pin D. This opening $d$ terminates at its ends in cone-shaped enlargements $d'$, and the faces of the bearing portion are preferably recessed, as at $d^2$, to receive a washer $d^3$, which may be of felt or other suitable material.

Mounted in the arms B B' of the fork are cones E E', and these cones are provided at their inner ends with conical surfaces $e\ e'$, corresponding to the cone-shaped enlargements $d'$ of the opening $d$ in the bearing portion, while the outer portions of the cones are screw-threaded, as at $e^2$, which threads engage similar threads in the openings $B^2$ in the arms B B'. These cones are also provided with suitable means for adjusting them—as, for instance, the slot $e^3$—and they are preferably provided with set-nuts F.

The swivel-pin D, as shown in the drawings, is provided at one end with a head D' and at the other end with a threaded end $D^2$, receiving a nut G, and as an additional means of security the end is further reduced, as at $D^3$, to receive a set-nut G', and preferably a pin H is also passed through an opening in the end of the swivel-pin as an additional safeguard.

Such being the construction of the device, the parts are assembled in the manner illustrated, and it will be seen that the cones E E' embrace the swivel-pin D and their conical faces bear closely against the conical enlargements $d'$ of the opening $d$ in the bearing portion, and by turning the cones one way or the other, adjusting them by means of their screw-threads in the arms B B' of the fork, they may be very accurately adjusted, so as to compensate for any wear and prevent any rattling, and they may be secured in position by their set-nuts or otherwise and the swivel-pin can be further secured by the nuts G G'. All these parts are readily made and easily assembled and furnish a most convenient and satisfactory means of securing and adjusting the steering-axle and one in which a tight joint can always be maintained, avoiding rattling and compensating for wear.

What I claim is—

1. The combination with a forked axle, of a knuckle or steering-axle comprising an axle supporting the wheel and an operating-arm for the axle the knuckle having an opening with conical enlargements, a swivel-pin passing through the opening, and adjustable cones fitting the enlargements and surrounding the swivel-pin, substantially as described.

2. The combination with a forked axle, of a knuckle having an opening provided with conical enlargements, a swivel-pin fitting said opening, and cones adjustable in the arms of the fork and fitting the enlargements of the opening, substantially as described.

3. The combination with a forked axle, of a knuckle having an opening provided with conical enlargements, openings in the arms of the fork, cones screw-threaded into the openings in the arms and fitting the enlargements in the knuckle, and means for adjusting and securing the cones in position, substantially as described.

In testimony whereof I have signed my name to this specification in the presence of two subscribing witnesses.

JACOB B. DECKER.

Witnesses:
CHAS. H. GILLANE,
CHESTER A. IDE.